United States Patent [19]

Dewey, Jr.

[11] 3,801,334
[45] Apr. 2, 1974

[54] SALT CASTING MIXTURES
[76] Inventor: Frank C. Dewey, Jr., 5246 N. Magnolia, Chicago, Ill. 60640
[22] Filed: Sept. 25, 1972
[21] Appl. No.: 291,834

[52] U.S. Cl.................. 106/38.3, 106/38.9, 106/89, 106/97, 164/36, 164/41, 164/132, 164/369
[51] Int. Cl............................................... B28b 7/34
[58] Field of Search ............. 106/38.3, 38.9, 89, 97; 164/369, 235, 132, 41, 36

[56] References Cited
UNITED STATES PATENTS
3,548,914  2/1970  Hill .................................. 106/38.3
1,523,519  1/1925  Gibbons............................. 106/38.9
3,692,551  9/1972  Weaver.............................. 106/38.3

*Primary Examiner*—Lorenzo B. Hayes
*Attorney, Agent, or Firm*—Mann, Brown, McWilliams & Bradway

[57] ABSTRACT

Alkali metal nitrates and nitrites are useful as core material for making disposable cores, mandrels and other forms for use in making hollow plastic articles. The improvement discloses adding Portland cement as a method for improving the structural strength of such cores while providing a long storage life.

5 Claims, 2 Drawing Figures

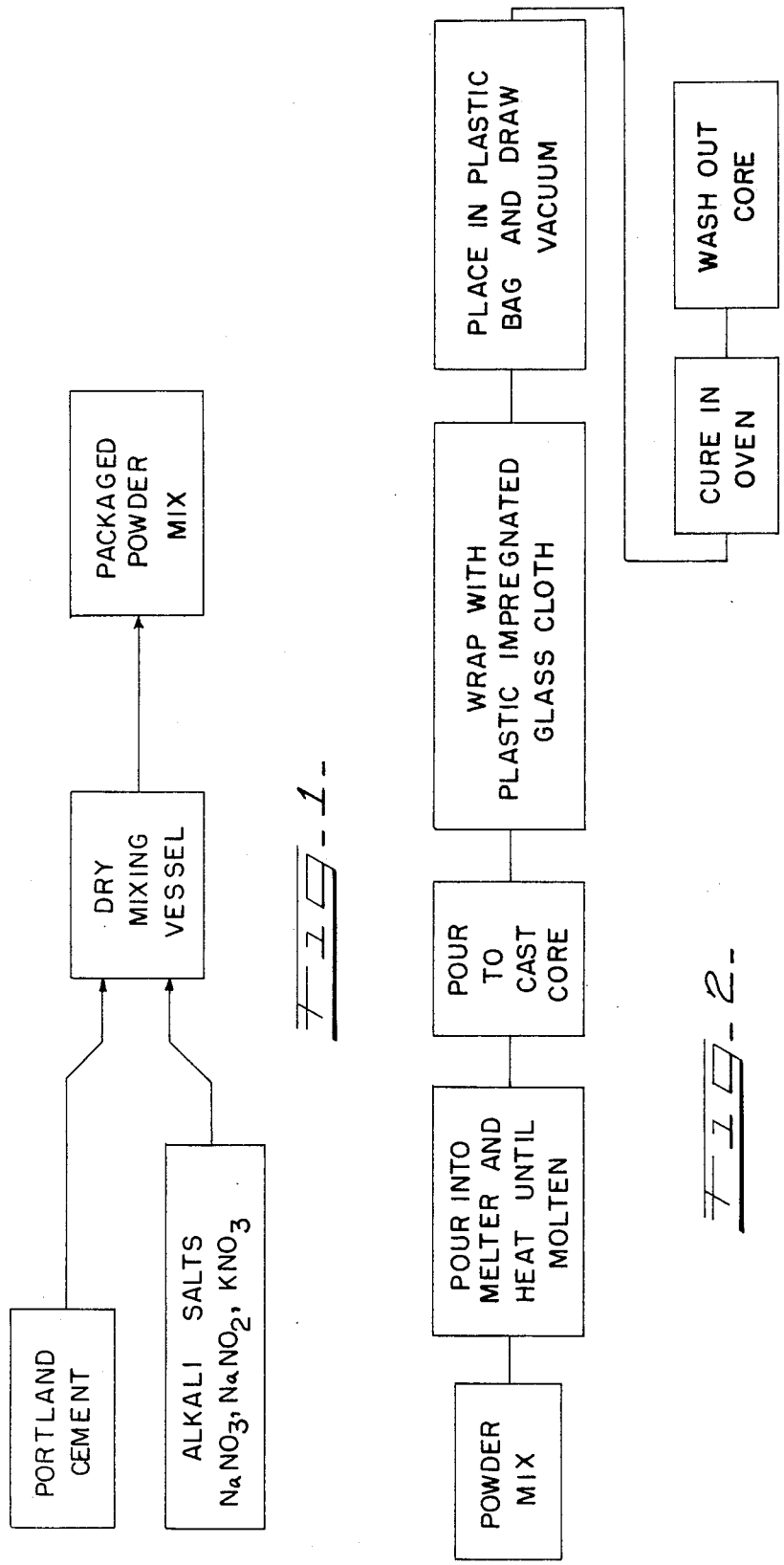

SALT CASTING MIXTURES

BACKGROUND OF THE INVENTION

The invention relates to disposable cores or mandrels for use in making hollow plastic articles. Included in the methods are ducting with plastic preimpregnated glass cloth, filament winding and injection molding. The invention relates to an improvement in the water soluble alkali metal salt mixtures useful for making such cores or mandrels.

In the aviation related fabrication of hollow ducts it has been the practice to prepare cores or mandrels out of various materials. Typically breakaway plaster has been used in casting mandrels or cores of the internal configuration desired. Thereafter a glass cloth, impregnated with uncured plastic resin, is wrapped around the core. The wrapped core is then wrapped with heat shrinkable plastic tape or put in a plastic bag which is evacuated causing the plastic bag to tightly conform upon the plastic resin impregnated glass cloth covered core. The plastic covered core is cured in an oven to polymerize the plastic to form the rigid duct or other hollow plastic article about the mandrel. The mandrel is then broken away and removed from the finished hollow duct.

There has been some use of alkali nitrate and nitrite salt mixtures to produce disposable cores that may be removed by dissolving them in water. However, these cores by the very nature of the salts involved, for example, sodium nitrate, sodium nitrite and potassium nitrate, tend to be of very limited usefulness. These salt mixtures must have melting points far above the curing temperature of the plastic being formed so as to provide a strong core upon which the material may be wound. But these salts are hygroscopic to such a degree that they absorb water out of the air even under what would be considered low humidity conditions. To function properly, they should be at or near a state of being anhydrous. In fact these salts tend to absorb so much water that their melting temperature and structural strength are greatly lowered.

Some attempts to remedy the problem have included adding calcium oxide or barium oxide to salt mixtures to control the water absorbed. While there has been some improvement, the resulting cores have been subject to cracking and failure due to thermal shock.

It is an object of this invention to provide an improved salt mixture for forming disposable mandrels which will prevent lower melting points and loss of structural strength. It is a further object to provide a qualitative means to determine when such mandrels have deteriorated. It is another object to provide a means for prevention of forming cores out of weakened material.

DESCRIPTION OF THE DRAWINGS

FIG. 1 is a flow diagram of the process of making the product of the invention.

FIG. 2 is a flow diagram showing a preferred method of use of the product of the invention.

DETAILED DESCRIPTION

I have found a means to treat a salt mixture so that it will not have its melting temperature lowered or its strength diminished. As is illustrated in FIG. 1, portland cement and the alkali salts, potassium nitrate, sodium nitrate and sodium nitrite are mixed in a dry mixing vessel and then are packaged. These salts and the Portland cement are free flowing and in a finely divided powdered form both before and after mixing.

The duct manufacturer receives the dry mixed powder and proceeds as is illustrated by FIG. 2. The mix is put into a melting vessel and is heated to a molten state. The molten mixture is cast in a hollow core by pouring it into a mold of the proper configuration, letting the mixture cool to coat the walls of the mold, and pouring the excess mixture out. This will leave a thin uniform wall core in the mold. Additional thickness may be provided by repeating the pouring process.

The core is removed from the mold and is ready for use in winding the duct. The conventional ducting process is to wrap the core with a plastice resin impregnated glass cloth. Then the wrapped core is placed in a plastic bag and is evacuated to force the bag tightly down against the impregnated glass cloth and core. The article and core are placed in a curing oven. The resinous material is cured while still under vacuum to form the rigid article. The core of the salt-portland cement mixture is then rinsed out with warm water to leave the finished article.

It is also practical to use these disposable cores for filament winding, the forming of erratic shapes in clear plastic and for injection molding. There may also be times when it is desired to break the core physically or melt it to remove it when the melting temperature of the core material is sufficiently below the softening or other destructive temperature of the cured article.

It is believed that the improved results are due to absorption of water by the calcium silicates and calcium aluminates in the Portland cement. It is assumed that these ingredients are more hygroscopic then the alkali salts and so keep them more nearly anhydrous. As water is added to the dry mix, it is readily absorbed without visible change in state. However, a molten mixture would also absorb water without apparent change but would exhibit a drastic increase in viscosity which would prevent pouring of the material to form disposable cores.

Another advantage of cores made out of this material is that a visual indication of strength of the core is now present. When a core absorbs more water than is safe or proper for use in making hollow objects, the core will indicate by having a crazed surface or will crack or break.

The following examples are illustrative of my invention keeping in mind that the most critical factor to be considered is compressive strength of the core at the curing temperature of the resinous material.

EXAMPLE 1

A control sample and material made in accordance with the invention were prepared as follows (ingredients given in parts by weight):

| Control | | Parts |
|---|---|---|
| potassium nitrate | | 33.75 |
| sodium nitrate | | 4.40 |
| sodium nitrite | | 25.50 |
| | Total | 63.65 |

| Sample I | Parts |
|---|---|
| potassium nitrate | 33.75 |

-Continued

Sample I | Parts
---|---
sodium nitrate | 4.40
sodium nitrite | 25.50
Portland cement-type 1 | 21.75
calcium oxide and hydroxide, inert filler and suspension agents | 14.60
Total | 100.00

Sample I and the Control sample were each put in a separate melter brought to a molten state and cast into samples as follows. Smooth pipe with a ⅝ inch inside diameter was used as a mold. The Control sample and Sample I were poured into the mold and allowed to cool and solidify. The solid castings contract enough to be easily slid from the mold. Sections approximately 0.6 inch in diameter and 2 inches long were cut from the castings. The ends were sanded smooth. The samples were placed in a high humidity chamber where the relative humidity was maintained from 75 to 90 per cent — with 80 per cent being the average for a period of about ten hours. The following compressive strengths were recorded after maintaining the samples at the indicated temperatures for 2 hours:

| | Control | Sample I |
|---|---|---|
| Room temperature (76° F.) | 10,000 psi | 17,000 psi |
| 175° F | 4,000 psi | 12,500 psi |
| 225° F | 200 psi | 11,000 psi |
| 275° F | liquified | 2,800 psi |

The dry powders of Sample I and the Control sample were placed in other separate melters, subjected to the same humidity conditions, and the samples were melted, cast into similar cores and tests of the compressive strength were the same as previously achieved. The material of Sample I starts to soften at 285° F.

EXAMPLE 2

A product useful for making mandrels for plastics curable up to 350° F. was made as follows:

Sample II | Parts
---|---
potassium nitrate | 46.50
sodium nitrate | 11.50
sodium nitrite | 14.00
Portland cement-type 1 | 7.50
Portland cement-type 2 | 7.50
calcium oxide and hydroxide, inert filler and suspension agents | 13.00

Cores of this material had a compressive strength of 18,000 psi at 76° F. and 3,000 psi at 350° F. These cores would soften at 360° F. The mixture of salts alone after exposure to high humidity melts at 250° F.

EXAMPLE 3

A product for making mandrels useful for plastic products curable up to 475° F. was made as follows:

Sample III | Parts
---|---
potassium nitrate | 54.10
sodium nitrate | 18.00
Portland cement-type 1 | 21.40
inert filler and suspension agents | 6.50

Cores of this material had a compressive strength of 19,000 psi at 76° F. and 1,575 psi at 450° F.

EXAMPLE 4

A product for making mandrels useful up to 440° F. was made as follows:

Sample IV | Parts
---|---
potassium nitrate | 34.50
sodium nitrate | 22.50
Portland cement-type 2 | 43.00

Cores of this material have a compressive strength of 2,000 psi at 440° F. The salt mixture alone after exposure to high humidity melts at 320° – 325° F.

It should be noted that there is a great time savings in using this improved salt mixture over breakaway plaster. There is no mixing time as opposed to at least 10 minutes to combine plaster and water. To form the mandrel the improved salt mixture is poured in, let set, and the excess poured out leaving a thin rigid form in less than 1 minute, while with plaster the casting has to be gradually built up taking at least three coatings and drying time in between for a total of at least 15 minutes and then 35 minutes setting time. The improved salt mixture cools to room temperature in less than ½ hour at which time it is ready to be used in making hollow ducts. The plaster mandrel must bd dried in an oven at 120° F. for approximately 24 hours before it is ready for use.

It should be noted that the portland cement used in this invention is used dry. It is also possible at great expense to grind the various silicates and aluminates in Portland cement clinker to achieve a similar result.

I claim:

1. In a mixture of salts of the group comprising sodium nitrate, sodium nitrite and potassium nitrate for use in making disposable mandrels, the improvement comprising an amount of Portland cement in said mixture said amount sufficient to stabilize the melting temperature of said mixture.

2. The improvement as set forth in claim 1 wherein the Portland cement is type 1.

3. The improvement as set forth in claim 1 wherein the Portland cement is type 2.

4. The improvement as set forth in claim 1 wherein the amount of Portland cement is from about 15 percent by weight to about 43 percent by weight.

5. A temperature stable water soluble disposable mandrel or relatively high compressive strength made from a material comprising a mixture of salts of the group consisting of sodium nitrate, sodium nitrite and potassium nitrate and a sufficient amount of Portland cement to stabilize the melting temperature of said mixture.

* * * * *